(12) United States Patent
Goretta et al.

(10) Patent No.: US 7,452,837 B2
(45) Date of Patent: Nov. 18, 2008

(54) FIBROUS CERAMIC MONOLITHS MADE FROM MULTI-PHASE CERAMIC FILAMENTS

(75) Inventors: Kenneth C. Goretta, Downers Grove, IL (US); Dileep Singh, Naperville, IL (US); Bryant J. Polzin, Mundelein, IL (US); Terry Cruse, Lisle, IL (US); John J. Picciolo, Lockport, IL (US)

(73) Assignee: UChicago Argonne, LLC., Chacago, IL (US)

( * ) Notice: Subject to any disclaimer, the term of this patent is extended or adjusted under 35 U.S.C. 154(b) by 0 days.

(21) Appl. No.: 10/275,537

(22) PCT Filed: Jan. 22, 2001

(86) PCT No.: PCT/US01/02140

§ 371 (c)(1),
(2), (4) Date: Oct. 3, 2003

(87) PCT Pub. No.: WO01/53059

PCT Pub. Date: Jul. 26, 2001

(65) Prior Publication Data

US 2004/0053030 A1    Mar. 18, 2004

(51) Int. Cl.
    *C04B 35/00* (2006.01)
(52) U.S. Cl. ............... 501/95.1; 264/171.1; 264/640
(58) Field of Classification Search ............ 264/638, 264/177.1, 177.11, 211.11, 171.1, 172.15, 264/640; 428/113; 501/95.1, 95.2
See application file for complete search history.

(56) References Cited

U.S. PATENT DOCUMENTS

| | | | | |
|---|---|---|---|---|
| 3,709,706 | A | * | 1/1973 | Sowman ............... 501/103 |
| 4,772,524 | A | * | 9/1988 | Coblenz ............... 428/699 |
| 5,645,781 | A | * | 7/1997 | Popovic' et al. ........... 264/639 |
| 5,783,139 | A | * | 7/1998 | Curran ............... 264/625 |
| 6,063,502 | A | * | 5/2000 | Sue et al. ............... 428/469 |
| 6,451,442 | B1 | * | 9/2002 | Sue et al. ............... 428/469 |
| 6,709,737 | B2 | * | 3/2004 | Rigali et al. ............ 428/304.4 |
| 6,803,003 | B2 | * | 10/2004 | Rigali et al. ........... 264/172.15 |
| 6,805,946 | B2 | * | 10/2004 | Mulligan et al. ......... 428/292.4 |
| 6,847,699 | B2 | * | 1/2005 | Rigali et al. ............ 378/143 |
| 6,974,624 | B2 | * | 12/2005 | Mulligan et al. ......... 428/304.4 |
| 2002/0140139 | A1 | * | 10/2002 | Sutaria et al. ........... 264/641 |
| 2002/0165304 | A1 | * | 11/2002 | Mulligan et al. ........... 524/404 |
| 2005/0008856 | A1 | * | 1/2005 | Dave ............... 428/364 |
| 2005/0019571 | A1 | * | 1/2005 | Mulligan et al. ........... 428/375 |
| 2006/0008549 | A1 | * | 1/2006 | Rigali et al. ............ 425/133.1 |
| 2006/0091580 | A1 | * | 5/2006 | Mulligan et al. ....... 264/172.15 |

OTHER PUBLICATIONS

Chawla, Krishan K. Composite Materials Science and Engineering. New York: Springer-Verlag, 1998. pp. 118-120.*

* cited by examiner

*Primary Examiner*—Steven P Griffin
*Assistant Examiner*—Russell J Kemmerle
(74) *Attorney, Agent, or Firm*—Cherskov & Flaynik

(57) ABSTRACT

A method for producing composite ceramic material is provided wherein a core ceramic structure is produced and simultaneously enveloped with a sleeve of similar material.

11 Claims, 6 Drawing Sheets

FIBROUS CERAMIC MONOLITHS MADE FROM MULTI-PHASE CERAMIC FILAMENTS

CONTRACTUAL ORIGIN OF THE INVENTION

The United States Government has rights in this invention under Contract No. W-31-109-ENG-38 between the U.S. Department of Energy and the University of Chicago representing Argonne National Laboratory.

BACKGROUND OF THE INVENTION

1. Field of the Invention

The present invention relates to a method for fabricating composite ceramic structures, and more particularly, the present invention relates to a method for fabricating multi-phase ceramic filaments to be used as building blocks for the structures.

2. Background of the Invention

When monolithic ceramic structures are stressed to the point of failure, they often fail with little or no warning, i.e., catastrophically. These monolithic ceramics simply load elastically to a maximum stress and then fail all at once.

Several techniques for improving the toughness of ceramic structures have been attempted. For example, fibers have been added to bulk ceramic material to increase its toughness. These are called continuous fiber ceramic composites. However, even these tougher materials can fail catastrophically.

Attempts have been made at forming ceramic structures which fail "gracefully" (i.e., with warning). One of these structures are known as fibrous monoliths (FMs), and are fabricated from billets comprising a composite ceramic containing both a strong cellular phase (a core) surrounded by a phase (in the form of a sleeve) designed to dissipate energy during fracture. Current FM production processes utilize multi-step protocols and heterogeneous materials. These processes make use of ram extrusion of slugs, and are thus batch processes by definition.

U.S. Pat. No. 4,772,524 awarded to Coblenz on Sep. 20, 1988 discloses a fibrous monolith whereby a cotton thread runs co-axially with the monolith produced. U.S. Pat. No. 5,645,781 awarded to Popovic et al. on Jul. 8, 1997 discloses a method for clamping or wrapping a sleeve of ceramic material around a dense core of ceramic material. These processes require separate steps and are thus considered "batch" operations.

Another drawback to current FM production processes is that hot pressing (often in an inert atmosphere) is generally used to densify the materials after their formation. To date, hot pressing in an inert atmosphere has been used to densify FMs such as silicon nitride (cell)/boron nitride (cell boundary) systems and diamond-cobalt (cell)/cobalt (cell boundary) systems. These FMs have been made from thermoplastic co-polymer blends that also require special processing during extrusion, such as close control of pressure and need for use of elevated temperatures above 160° C., Hot pressing limits the shapes of the FMs that can be produced. Also, this process is costly.

A need exists in the art for a process for producing ceramic composites which utilize common extrusion equipment and similar phase materials. The process should produce a structure which yields gracefully. The process also should utilize common ceramic materials and sintering steps conducted in air and at ambient pressure to further minimize cost. Finally, the process should incorporate the least number of steps, and preferably comprise a single step or continuous process so as to expedite production in large industrial scale scenarios.

SUMMARY OF THE INVENTION

It is an object of the present invention to provide a method for producing ceramic composite materials that overcomes many of the disadvantages of the prior art.

Another object of the present invention is to provide a continuous process for producing ceramic composite material. A feature of the invented method is the use of a standard extrusion machine. An advantage of the invented method is that minimal fabricator training is required, resulting in an optimization of personnel and existing equipment, and ultimately lower costs.

Yet another object of the present invention is to provide a process for producing robust unidirectional or multidirectional fibrous monoliths. A feature of the invented method is careful matching of shrinkages and thermal-expansion coefficients of the various phases comprising the monoliths. An advantage of the invented method is the ability to sinter in air and at atmospheric pressure (i.e., pressure-less sintered) to produce the fibrous monoliths, thereby obviating the need for hot pressing in an inert atmosphere to accomplish densification. This leads to a reduction in cost of many FM parts by a factor of up to 100.

Still another object of the present invention is to provide a process for producing fibrous monoliths which are stable at a myriad of operating conditions. A feature of the process is the utilization of different particles sizes of the same compound for both the cell phase and the cell boundary layer. An advantage of the invented process is the elimination of material compatibility problems, thereby also eliminating diffusion between phases so as to permit operation at higher temperatures. Stability in oxidizing, inert and reducing temperatures also is realized.

Yet another object of the present invention is to provide layered materials comprised of multi-phased filaments. A feature of the invention is that when the filaments are juxtaposed or "laid up" next to each other prior to pressing, no voids exist between the filaments. An advantage of the invention is that eventual packing of these composite strands results in very dense structures, sans any voids or deformations between the filamentous components, so as to render the materials with high strength and toughness.

Briefly, the invention provides for a method for producing composite ceramics, the method comprising simultaneously forming a ceramic core coaxial with a ceramic sleeve.

Also provided is a fibrous monolith comprising a plurality of multi-phase filaments arranged in a configuration to cause graceful failure of the monolith when the monolith is placed under mechanical stress.

A fibrous monolith comprising a plurality of two-phase filaments containing $ZrSiO_4$ is also provided.

BRIEF DESCRIPTION OF THE DRAWINGS

These and other objects and advantages of the present invention will become readily apparent upon consideration of the following detailed description and attached drawing, wherein.

DETAILED DESCRIPTION OF THE INVENTION

A low-cost, highly optimized method for producing fibrous monoliths from duplex ceramic filaments is provided. Salient features of the invented method include the simultaneous formation and envelopment of a ceramic core phase with a ceramic sleeve phase. This simultaneous formation is the result of the continuous extrusion of FM filaments, including solid freeform fabrication, so as to achieve net-shape fabrication of FMs.

The filaments each have a first phase and a second phase. whereby the second phase is peripherally arranged about the first phase and coaxial to the first phase. Generally, the first or core phase is relatively dense compared to the sleeve phase, the latter commonly referred to as the cell boundary phase.

The resulting duplex filaments represent a composite structure containing a strong continuous cellular phase surrounded by a second phase that is designed to dissipate energy during failure. This second or surrounding boundary phase has a non-brittle fracture characteristic to allow for gradual splitting and delamination.

Specifically, metal oxide-based fibrous monoliths (FMs) containing porous cell boundaries and dense cells were fabricated by their simultaneous extrusion and subsequent lay up of filaments. The resulting construct was then sintered. Resulting bars of the material exhibited significant energy dissipation during fracture and retained some load to large displacements. The FM bars exhibited clear evidence of crack deflection and delamination.

Figure 1:
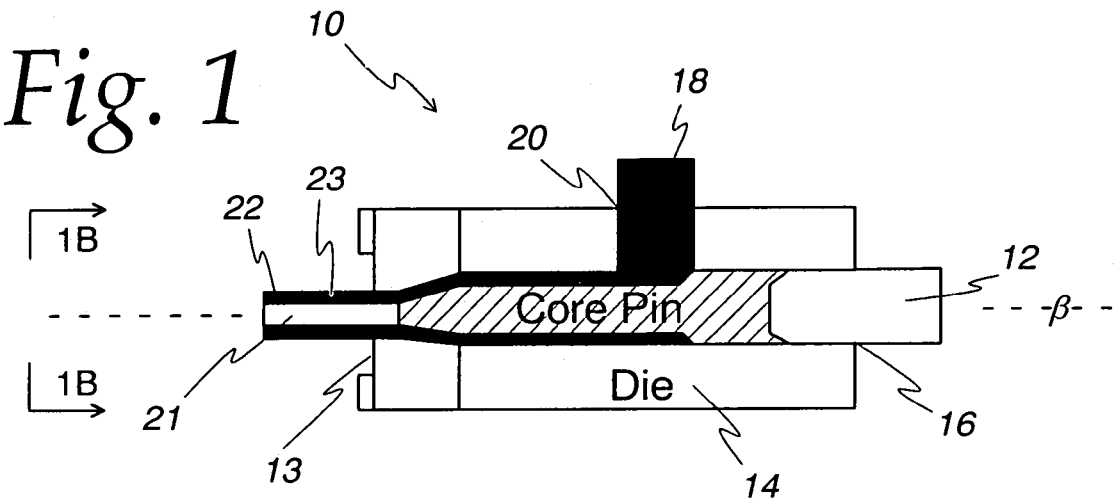
FIG. 1 is a schematic depiction of the invented co-extrusion process, in accordance with features of the present invention.
Figure 2:
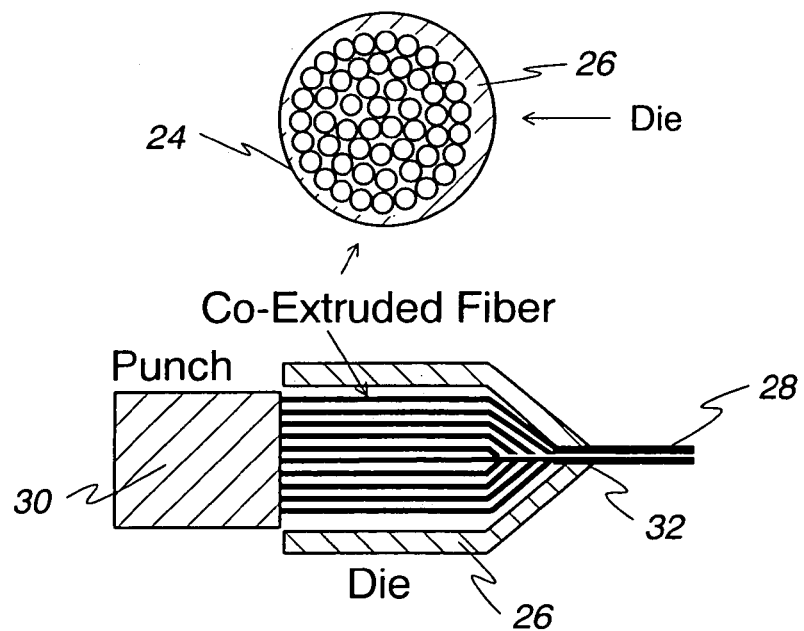
FIG. 2 is a schematic depiction of a process for producing unidirectional fibrous monoliths from the invented duplex filaments, in accordance with features of the present invention.

FIGS. 1 and 2 provide a schematic depiction of the process. The co-extrusion process, which produces the duplex filaments, is depicted as numeral 10 in FIG. 1. Cell material 12 from a screw extruder (not shown) enters the die 14 along the latter's longitudinal axis β. The cell material enters the die through a first injection port 16.

The screw extruder allows cell material to be continuously fed into the first injection port 16. As such, plug size is no longer a limiting factor. The invented continuous hopper design makes it possible to produce any length cell material desired. This configuration also streamlines FM fabrication procedures. For example, spoolable filaments can be produced.

Although screw extrusion is the preferred approach to producing continuous multilayer filaments, ram extrusion also can be used.

Figure 1B:
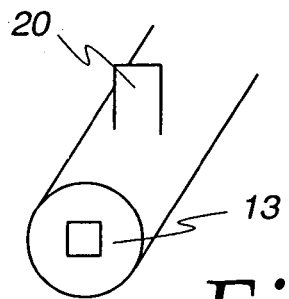
FIG. 1B is a view of FIG. 1A taken along line B-B.
Figure 1C:
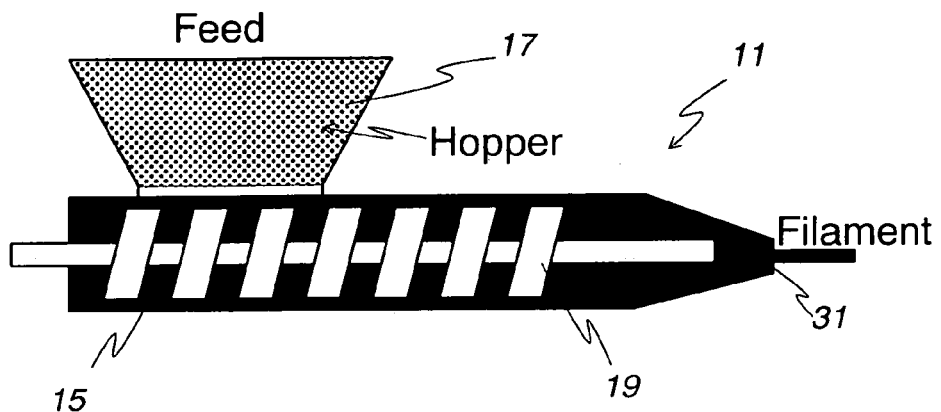
FIG. 1C is a schematic depiction of a continuous hopper configuration, in accordance with features of the present invention.

A preferred method for continually feeding cell and/or boundary phase material into the filament die 14 is depicted in FIG. 1C. Generally, a screw-driven machine, designated as numeral 11 is utilized, material is fed into an open bore 15, from a continuous feed hopper 17. An axial rotating screw 19 forces the introduced material through an exit orifice 31.

The method comprises forming material, comprising constituents of the core, into a first plastic mass; forming material comprising constituents of the sleeve into a second plastic mass; forcing the first plastic mass into a first entry port of a co-extrusion dye while simultaneously forcing the second plastic mass into a second entry port of the co-extrusion dye so as to produce a duplex filament wherein the core is coaxial to and surrounded by the sleeve; repeating until a desired number of filaments are produced; subjecting the produced filaments to a ram extrusion process to produce a fibrous monolith; assembling the fibrous monoliths into a predetermined shape; and sintering the assembled fibrous monoliths.

This continuous method allows for the substitution of cell and/or boundary materials in "mid-stream", inasmuch as individual hoppers can be utilized for different materials or for continuous production of multilayer filaments. In a ram extruder, multiple slugs can be utilized without worrying about the joint or interface between plugs. This multiple hopper configuration thus facilitates the production of a cell-and/or boundary-phase comprised of a single constituent phase or of different materials along its linear axis, creating a linear variability of phase constituency. This linear variability imparts different strengths and durabilities of the phase(s) along its (their) length(s).

alternatively, multiple hoppers facilitates the production of filaments of any length, inasmuch as the hoppers can be fed continuously.

The filament (shown and named in the FIG. 1C) emanating from the hopper/screw configuration is then utilized either as a feed for cell phase material (at the first ingress point of the extruder, element 16 FIG. 1A), or as a feed for the boundary phase material at the second ingress point (element 18 of FIG. 1A).

Simultaneous with the injection of the cell material, cell boundary material (shown and named in the FIG. 1D) from a second screw extruder (also not shown) enters the die 14 from a second injection port 20. A duplex filament 22 is produced having a cell or core 21 and a boundary phase 23. This aspect of the production process can be performed at room temperature, inasmuch as the plastic materials representing the injectable core and sleeve matter contain no thermoplastic materials that require heating to soften into a "workable" state. As such, the instant plastic materials are workable at room temperature.

These filaments 22 can be stored for up to several days.

Filament Manipulation Detail

Once the filaments are formed, they can be pretreated in a myriad of ways, prior to being formed into bundles. For example, filaments 22 emanating from the die 14 can be coated with a material to impart a three- or four- or more-layered structure to the filament. Coatings also can be employed to impart a desired texture to the outer surface of the resulting multi-phase filaments so as to increase friction and therefore stymie pull-out tendencies. Coatings also can be applied to impart additional ceramic layers, thereby fortifying the final strength characteristics of the resulting multiphase filament.

Figure 1D:
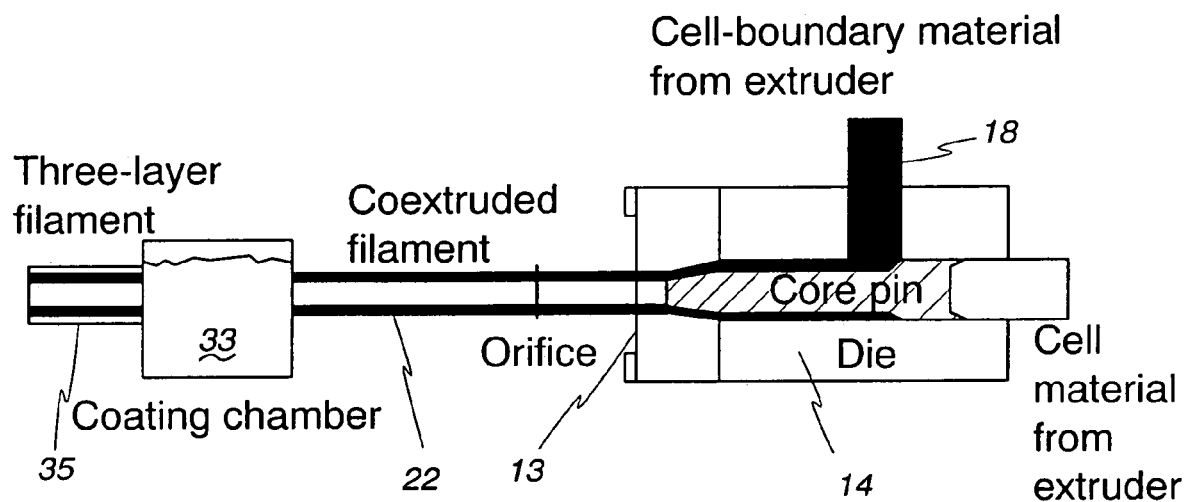
FIG. 1D is a schematic diagram of the invented co-extrusion process and coating process, in accordance with features of the present invention.

An exemplary process for applying coating is illustrated in FIG. 1D. Briefly, duplex or multilayer filament 22 extruded from the die 14 is routed to a means for contacting the filament with a desired coating. For example, a coating chamber 33 is utilized after filament formation to apply a third phase 35 to the outside surface of the filament 22. Other coating means include dip coating, spray coating, painting, or doctor-blade wiping.

The constituency of the coating will vary, depending on the characteristic desired by the coating. In the case of laying down an additional ceramic phase, approximate coating constituent values are as follows, plus or minus 30 percent of each value:

25 weight percent ceramic powder;
58 weight percent solvent;
14 weight percent binder;
2 weight percent plasticizer; and
1 weight percent dispersant.

The solvents, binders, plasticizers and dispersants utilized are standard for the ceramic process industry. Suitable constituents include xylene and/or butanol for solvents, thermosetting acrylic polymers for binders, butyl benzyl phthalates for plasticizers and fish oil for dispersant. Exemplary constituents include 78/22 weight percent xylene/butanol as solvent, Rohm & Haas AT-51 binder, Monsanto S-160 plasticizer and Menhaden fish oil or similar standard dispersant.

Filament Arrangement Detail

Ultimately, the filaments are formed into bundles 24. As depicted in FIG. 2, the filament bundle 24 is placed in an extrusion dye 26 and extruded to form unidirectional fibrous filaments 28. A punch 30 or similar device is utilized to force the bundle through the exit orifice 32 of the extrusion dye. The masses for coextrusion (both core and sleeve) produce initial torque values of 4-12 newton meters. The coextrusion process requires a force of 5 to 50 MPa, most commonly 10-40 MPa. The ram extrusion process requires a force of 10-50 MPa, most commonly about 15-28 MPa.

The resulting FM filaments are then subjected to lay up processes. In one lay up scenario, FM filament is first formed into sheets by, for example, sectioning the filament into lengths and arranging them side by side in a plate or bar die. Instead of side-by-side juxtaposition, the filaments can be serpentined along the plane in a die defining the sheet, or even patterned into a sheet in a solid free form fabrication. The lay up process is completed by stacking and shaping the sheets to form FM test specimens.

Figure 10:
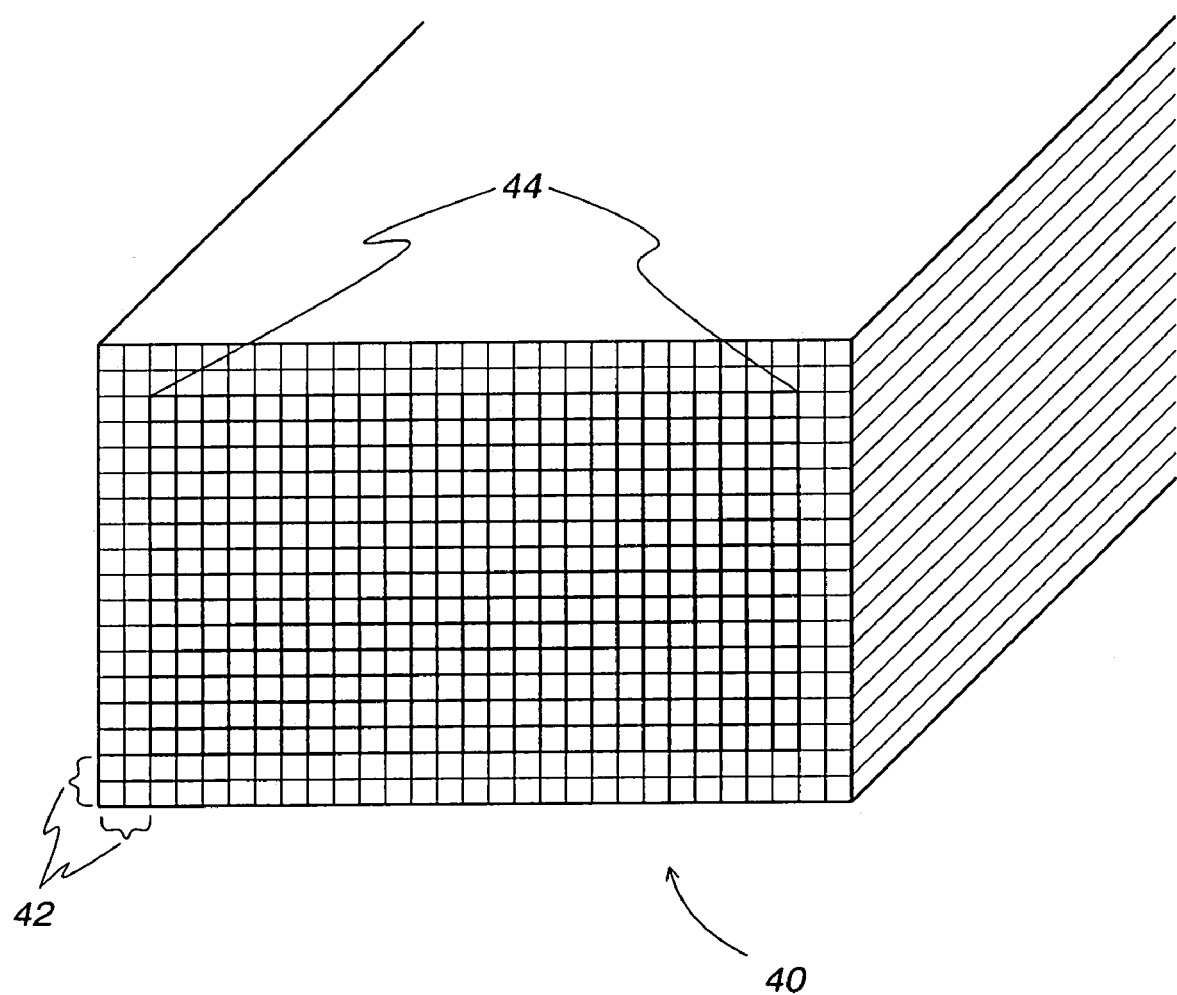
FIG. 10 is a perspective of a graded fibrous monolith structure, in accordance with features of the present invention.

The inventors have devised a graded structure, depicted in FIG. 10 as numeral 40, as a fibrous monolith configuration. In a preferred graded embodiment, peripheral regions 42 of the monolith 40 contain filaments comprised of 60-90 volume percent cell phase. By contrast, the region of the monolith extending inwardly 44 (i.e., medially directed away from the periphery) contains filaments with at least approximately 5 volume percent lower cell phase, compared to its boundary phase. Generally, lower cell phase volume percents in the inner regions impart higher toughness to the body of the structure and higher cell phase volume percents impart higher strength to the periphery region of the structure, which is typically subjected to higher stress.

An exemplary volume percent ratio in such a graded structure is 80/20 cell/boundary phase volume percent for periphery filaments and ≦75 percent cell phase/≧25 percent boundary phase for filaments residing in the inner portion of the monolith.

After laying up (which can be done by hand or with use of an automated system) and pressing the filaments into desired monolith configurations, the resulting structures are then sintered at temperatures ranging from approximately 1000° C. to 1600° C. for a time sufficient to achieve the desired density of the core phase and the porosity of the surrounding sleeve. Alternatively, instead of being subjected to sintering, the resulting structures are hot-pressed at approximately the same temperatures.

Figure 3:
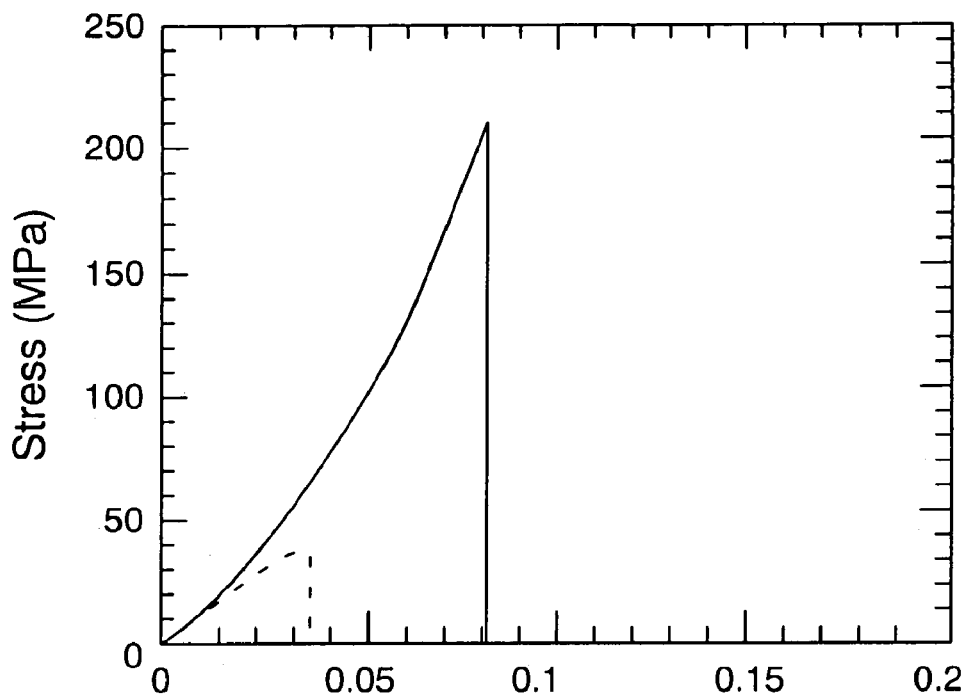
FIG. 3 is a stress v. displacement curve for typical monolithic ceramics.
Figure 4:
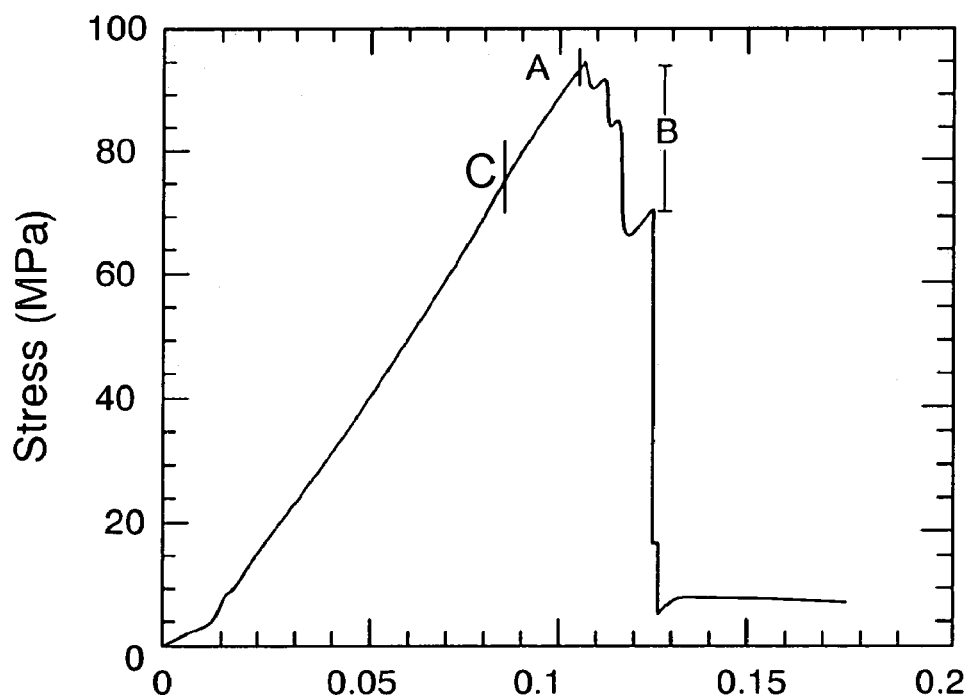
FIG. 4 is a stress v. displacement curve for a fibrous monolith produced from duplex filaments produced via the invented method, in accordance with features of the present invention.

Four point flexural tests were conducted on the cell material, cell-boundary material and FMs. FIG. 3 depicts the stress-displacement curves for the core material (solid line) and sleeve material (dotted line) before their combination to form a duplex filament. FIG. 4 depicts the stress-displacement curve for the FM which represents a combination of the core and sleeve material. Both the core material and the sleeve material, when tested separately, exhibited fast fracture at maximum stresses of approximately 220 MPa and 430 MPa, respectively.

FIG. 4 shows FM bars failing at higher strain (compared to the materials depicted in FIG. 3), as evidenced by the large area under its curve after the maximum load has been attained, and also as depicted by the jagged, downward curve between 0.1 mm displacement and 0.13 mm displacement. FIG. 4 shows three key features that provide the toughness characteristic of the FM material. The first feature is nonlinearity prior to reaching maximum load. This feature is depicted in region A of FIG. 4 which shows a slight downward deviation of the curve or a slight weakening of the construct between 0.08 mm and 0.105 mm displacement. The bending illustrated in region "A" depicts the small scale fracturing, which is indicated by acoustical or thermal signature. Such signatures serve as a warning that the component stress should be decreased to avoid failure.

The second feature, designated as "B", is a series of unload/loading steps during crack propagation. This second feature represents an intermediate zone of fracturing of the construct, with splintering of the construct occurring more rapidly than that seen in the first phase (i.e. region "A") of failure.

The third feature of the invented FM is its retention of small load-carrying capability to very large strains. As depicted in region C of FIG. 4, some adherence remains in the construct, even after a precipitous drop in strength, so that approximately 5 to 7.5 MPa of yield is evident.

Figure 6:
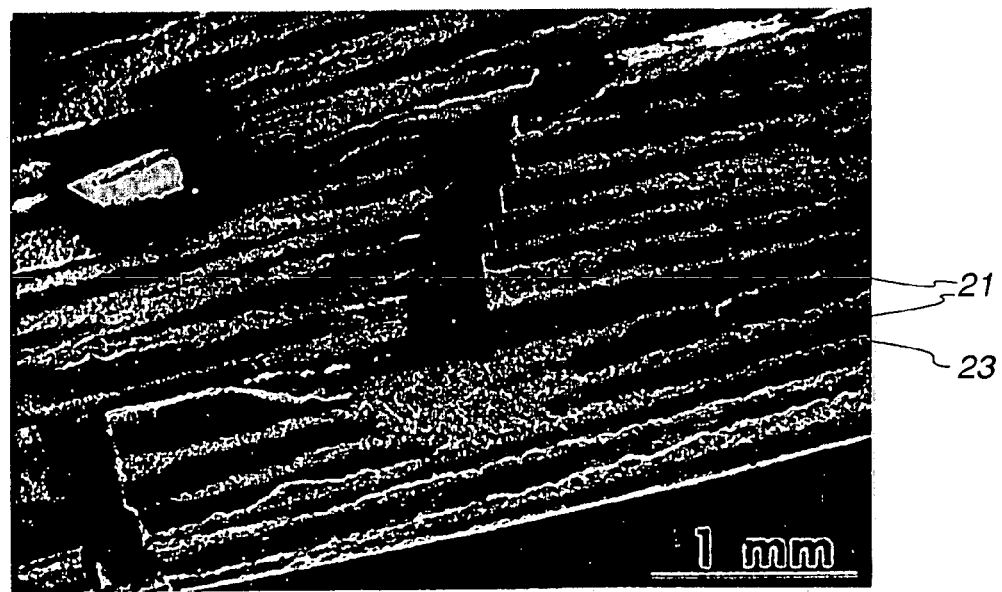
FIG. 6 is a photomicrograph depicting stress faults through the invented construct, in accordance with features of the present invention.

Scanning electron microscopy indicated that the unloading steps observed in the FM stress v. displacement curves were caused by energy-dissipating events such as crack delamination, crack deflection, and some cell pull-out. As depicted in FIG. 6, the inventors have found that primary cracks follow tortuous paths through the FM, making several 90 degree deviations through the cell-boundary phase 23 before continuing through the FM. Point 25 in FIG. 6 represents the fracture origin.

Cell and Boundary Configuration Detail

Figure 7:
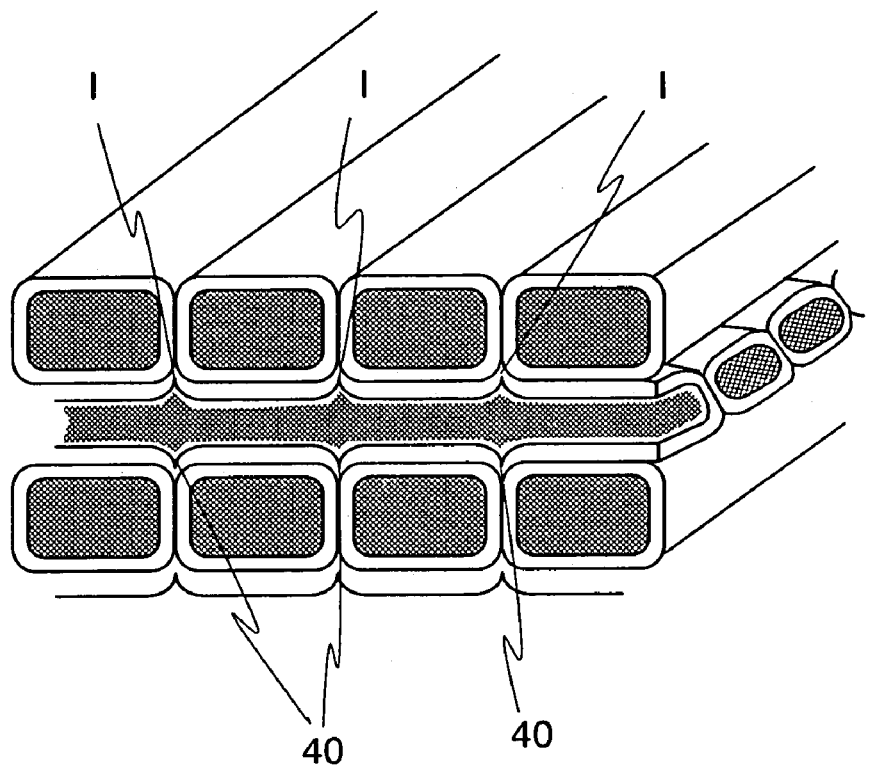
FIG. 7 is a schematic depiction of deformation occurring in packing ovoid-shaped or round fibrous monoliths.

Strength of the resulting FMs is further enhanced if the individual filaments 22 are configured to shapes to facilitate dense packing of the filaments. As such, in some instances, round filaments are to be eschewed to prevent the formation of void space or interstitial spaces (see "I" in FIG. 7) between laid up filaments. When these filaments are subsequently compressed to make monoliths, particularly when cross-plies are made, a certain degree of collapsing or caving-in occurs to fill those interstitial spaces, thus forming cusps 40. This leads to distortion. Such distortion presents potential points of breakage, particularly when the angle between adjacent filament layers is 90 degrees.

Figure 8:
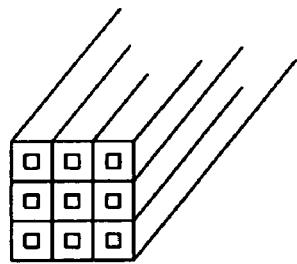
FIG. 8 is a perspective view of laid-up non-ovoid filaments, in accordance with features of the present invention.

To avoid the creation of spaces, rectangular or polygonal filaments instead are produced and juxtaposed to each other, as seen in FIG. 8. As such, resulting cross-ply laminates contain fewer and much smaller distortions. Compared to the laminate depicted in FIG. 7, the amount of energy required to pull these fibers out of a FM of the type illustrated in FIG. 8 is higher; therefore, graceful failure and higher toughness is achieved.

Alternatively, void space between juxtaposed round filaments are minimized if the round filaments are first flattened prior to firing (i.e., while the organics are still present in the filaments.) Flattening can be accomplished by pressing or rolling. Inasmuch as the flattening process causes the filaments to take on a rectangular configuration, void spaces are removed. The resultant sheets can then be readily stacked.

Figure 9:
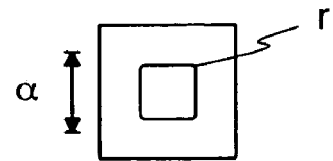
FIG. 9 is a cross section of a two phase filament with round-corner cell phase, in accordance with features of the present invention.

The inventors also learned that cell phases which vary in cross section compared to boundary phase filaments can result in added strength to resulting fibrous monoliths. For example, rounding the "corners" of cell phase cross sections minimizes the severity of stress concentration points, thereby imparting higher strength to the cell phase during loading. A cross section of an exemplary composite fiber is depicted in FIG. 9. The filaments have cross sections resembling triangles or squares or rectangles or trapezoids or hexagons or combinations thereof.

Generally, no limits on the radius of curvature are required. Preferably, however, the radius would fall into the following approximate range:

$$0.02a \leq r \leq 0.2a$$

whereby "a" is the dimension of the side of a polygon that is the cross section, and "r" is the radius of curvature of the round corners of the cell phase. Setting r to between $1/50$ and $1/5$ of a side is suitable.

The inventors found that triangles, squares, trapezoids, rectangles and hexagons are particularly suitable cross-section configurations for the cell phase.

Particle Preparation Detail

A salient feature of the invented processes the production of FMs which are produced in situ from oxide powders. The graceful failure depicted by the invented FM is the result of tailoring particle sizes of the two constituents (i.e. the core or cell, and the sleeve or cell boundary phase). The inventors have found that the density and relative strength between the core and sleeve phases is controlled by controlling particle sizes. To create the necessary microstructure of the resulting fibrous monoliths, the inventors utilized milling and settling techniques to create well-controlled particle size distributions. Generally, particle sizes of the constituents comprising the core material are smaller than the particle sizes of the oxides comprising the sleeve material. Core particle sizes range from approximately 0.3 microns (μm) to 3 μm. The sleeve's oxide powders contain particle sizes ranging from 5 to 50 μm.

The powders of specific size become constituents in a first plastic formulation for the core extrusion process and a second plastic formulation for the sleeve extrusion process. Generally, each of the prepared powders were mixed with organics and vibratory milled for a time sufficient to create the desired particle sizes and dispersion. More detailed formulation details are provided in Example 1 below for $ZrSiO_4$ powders.

While the example contained herein deals with a $ZrSiO_4$ oxide, a myriad of oxides also are candidates for the plastic formulation process, including, but not limited to, $Al_2O_3$, mullite, yttrium aluminum garnet, or combinations thereof. Generally, materials exhibiting good high-temperature properties are suitable. Through doping and control of powder particle size, these materials are processed over a range of densities and strengths.

Reduction in the concentration of fine oxide powder in the cell boundaries further weaken the cell/boundary interface and promote additional delamination and deflection.

Residual Stress Detail

The inventors have found that residual stresses can be built into fibrous monoliths, leading to a substrate which arrests propagating cracks. Residual stresses are established when two materials are bonded well to each other and cool together from a processing temperature. If the materials have different coefficients of thermal expansion (CTEs), stresses are created.

Residual stresses arise from differences in thermal expansion coefficients between the cell and various surrounding layers in the fibrous monolith. The sum of the residual stresses will be zero. If residual stresses are engineered into strategic locations of a monolith, crack propagation can be arrested. A stress of approximately 1 GPa or greater can arrest a crack. More detailed discussion of engineering residual stresses in multilayered structures appears in D. J. Green et al., *Science* 283, 1205-1297 (1999); and M. P. Rao et al. *Science* 286, 102-104 (1999), and incorporated herein by reference. However, the application of residual stresses in fibrous monoliths are unknown.

Surprisingly and unexpectedly, the inventors found that residual stresses are established in FMs by controlling the concentration of oxides in the cell and boundary layers, and that a sintered fibrous monolith with these residual stresses can be prepared. These fibrous monoliths remained intact; the stresses did no induce failure. For example, controlling the concentration of such materials as aluminum oxides, mullite, zirconium oxide, or yttria-alumina garnet will modify the residual stresses. Generally, the materials are selected so that they (a) bond, (b) are compatible with each other, and (c) have CTEs that are the right difference ($CTE_{cell} - CTE_{-boundary} = \Delta CTE$) so that for a given ratio of volume of cell to volume of boundary material and for a given sintering or processing temperature, the targeted residual stresses are established.

The inventors assume an average $\Delta T$ (processing temperature to room temperature) of approximately 1000° C., with a range of between approximately 600-1600° C. For any given ratio of cell to cell boundary (by volume fraction) the inventors have devised a $\Delta CTE$ range to provide the target stresses. Table 1 lists target coefficient of temperature expansion values for exemplary cell material/boundary material volume percents.

TABLE 1

Coefficient of Thermal Expansion for specific cell/boundary ratios

| Ratio in Volume % | $\Delta CTE$ (° C.$^{-1}$) |
|---|---|
| 90/10 | $0.2 \times 10^{-6}$ |
| 80/20 | $0.9 \times 10^{-6}$ |
| 70/30 | $2 \times 10^{-6}$ |
| 60/40 | $3.7 \times 10^{-6}$ |

The values listed in Table 1 depend on the exact temperature and slightly on configuration. As such, the variability of the $\Delta CTE$s listed may be as much as ±50 percent. Table 2 below provides residual stress data for exemplary fibrous monoliths.

TABLE 2

Residual Stress data for selected fibrous monoliths

| Core Material | Core CTE (1/° C.) | Sheath Material | Sheath CTE (1/° C.) | Volume Ratio (cell/sheath) | Resid. Stress Core (MPa) Tensile | Resid. Stress Sheath (Mpa) Compress. |
|---|---|---|---|---|---|---|
| ZTM* (50/50) half-half by volume | 8.75 | MTA* 50/50 half-half by volume | 7.55 | 70/30 | 1500 | 700 |
| ZTA* (10/90) 90% alumina by volume | 9.44 | MTA (50/50) | 7.55 | 80/20 | 300 | 3100 |
| Alumina | 9.2 | Mullite | 5.9 | 80/20 | 200 | 3400 |
| ZTA (10/90) | 9.44 | MTA | 8.87 | 80/20 | 120 | 1200 |
| Mullite | 5.9 | MTA (50/50) | 7.55 | 80/20 | 540 | 1900 |
|  |  |  |  | 70/30 | 1700 | 900 |

*MTA = mullite + alumina; ZTM = yttria-stabilized zirconia + mullite; ZTA = Yttria-stabilized zirconia + alumina.

Cell- and Boundary-Phase Dimension Detail

Aside from manipulating the constituents of the two phases, or the shape of the two phases, the invented device facilitates rapid modification of the distances between the laminar phases and also the final extrusion shape of the composite fiber.

For example, the diameter of the core pin as seen in FIG. 1 is configured to provide the desired thickness of the boundary layer, defined as the thickness of the annular space between the pin and die 14. This annular space determines the thickness of the boundary layer surrounding the cell layer and therefore the area fractions of the core/sleeve phases. Typically, thicknesses of between approximately 0.01 millimeters (mm) and 0.1 mm for the boundary layer are targeted.

The utilization of a plurality of core pins will facilitate the extrusion of three, four, or multi-layer filaments. In such an instance, the pins are successively arranged coaxial with each other, so as to extend along the longitudinal axis of a longer die than typically used when just one pin is present. For example, in the generation of a three-layer filament, a first pin would generate the starting cell phase. A second pin, proximal to the final exit point of the filament and therefore intermediate between the exit point and the first pin, is adapted to receive the just-produced two-phase filament to facilitate production of the three-layer filament. In essence, the second pin is arranged "down-stream" from the first pin.

In addition, and as also depicted in FIG. 1B, which is a view of FIG. 1 taken along line B-B, an end cap 13 of the die is configured to effect a desired cross section of the double-phase filament. FIG. 1B depicts a rectangular exit orifice of the die, therefore, resulting extruded double-phase filaments will be rectangular in cross section.

EXAMPLE 1

$ZrSiO_4$ powders were obtained from Alfa Aesar of Ward Hill, Mass., and Remet of Utica, N.Y. The Alfa Aesar powder was utilized for the dense cell (i.e. core) and the Remet powder was used for the porous cell boundary. Each of these powders was processed differently. The as-received Alfa Aesar powder had an average particle size of 1 μm. It was ball-milled in isopropyl alcohol with $ZrO_2$ milling media for 72 hours, then dried and screened through a 100-mesh (150 μm, or 0.0059 inches) sieve. The resulting particle size was 0.7 μm.

Remet flour-grade powder was first processed to remove the finest particles. Three Remet powders were classified by sedimentation once, twice or thrice, with the average particle sizes for each of powders being 13.5 microns, 22 microns and 29 microns, respectively. The principal difference between the three powders is the fraction of fines that remain after settling. Approximately 100 grams of the Remet $ZrSiO_4$ powder, having an initial particle size of 7 μm, was placed in a 1000 milliliter beaker with 800 milliliters of deionized water and 20 drops of a deflocculent (i.e., a dispersing agent.) Darvan C, available from R. T. Vanderbilt Company, Inc., or Norwalk, Conn. is a suitable deflocculent. The solution was mixed for approximately one minute and then allowed to stand for a time sufficient for the two phases to develop, which in this instance was approximately 3 minutes. The remaining solution was decanted and the settled material was retained. The settled powder had an average particle size of 13.5 microns.

After the $ZrSiO_4$ particles are sieved, their plastic processing begins.

In a first step of plastic processing, the necessary composition must be batched and then subjected to a vibratory or ball mill for a time sufficient to create an homogenous mixture. Table 3 shows the components and concentrations that were used in exemplary plastic mixes. Generally, the plastic mix constituents include the ceramic powders, a binder, a solvent, a plasticizer and a deflocculant. Generally, the binders serve to hold the particles together. A myriad of binders are commercially available and suitable for incorporation in the instant formulation. Suitable binders are medium to long-chain polymers with end functional groups. The ends attach to the powders and in so doing, provide a measure of strength to the mixture. AT-51 Binder from Rohm & Haas, Philadelphia, Pa. is one such suitable binder.

Plasticizers are utilized in the mix so as to modify the structure of the binder to make the later more flexible. An exemplary binder is butyl benzyl phthalte, marketed as S-160 Plasticizer from Monsanto, Fayetteville, N.C. S-160 is a short-chained polymer.

Deflocculents prevent agglomeration of the powders by minimizing electrostatic attractions between the powders. Fish oil is a standard deflocculant.

Solvent is utilized to provide homogeneity to the organic mix. It is the vehicle in which the organic constituents dissolve. As such, a myriad of solvents are suitable for the invented process. Xylene/butanol is an exemplary solvent.

Carbon powder is a constituent specific for the cell boundary slip. It serves to minimize the shrinkage differential between the cell phase and the boundary by leaving voids after burn off of the sleeve. The presence of the voids is short-lived inasmuch as the sleeve layer constituents cave in to fill the voids. The carbon also is used to differentiate the sleeve phase from the cell phase inasmuch as the ceramic powder is white and the carbon is black.

TABLE 3

Composition of plastic mixes used for extruding $ZrSiO_4$ filaments

| Constituent | Alfa Aesar $ZrSiO_4$ (g) | Remet $ZrSiO_4$ (g) |
| --- | --- | --- |
| 78 wt % xylene/22 wt % butanol | 20 | 15 |
| Monsanto S-160 Plasticizer | 10 | 10 |
| Dilute fish oil in xylene/butanol | 10 | 10 |
| $ZrSiO_4$ powder | 200 | 200 |
| Rohm & Hass AT-51 Binder | 21 | 21 |
| Carbon Powder | 0 | 0.25-5 |

After the mixes were milled overnight, they were de-aired, tape cast to a thickness of approximately 0.5 mm, substantially dried and stripped. The tapes were allowed to sit overnight and were then mixed in a Brabender high-shear mixer. Mixing was used to adjust viscosity to the necessary levels for co-extrusion. Inasmuch as not all solvent is removed during the drying process, the "dried" mixes retained some flowability. Essentially, the drying increases viscosity of the mix.

In the co-extrusion process, depicted in FIG. 1, two Brabender screw extruders were attached to the co-extrusion die 14. The Alfa Aesar plastic mix was introduced into the first entry port 16 (i.e., a first extruder hopper) of the die and the Remet plastic mix was fed into a second entry port 18 (i.e. second extruder hopper) of the die. The two separate plastic mixes were simultaneously forced into the extrusion die to produce an initial filament 22.

The filaments were cut into 10 centimeter sections and bundled, as depicted as element 24 in FIG. 3. The bundle was then placed in an extrusion die and extruded to produce a fibrous monolith filament 28.

The fibrous monolith was cut into 50 mm sections, stacked in a bar die, and pressed in a bar die at a pressure of approximately 100 MPa. The resultant bars were then heat treated. Binder burnout was accomplished in flowing $O_2$ or $N_2$. Binder can be burned out in any oxidizing or inert atmosphere. Each bar was heated to 140° C. at 50° C. /hour and held for 0.1 hours. After the hold, each bar was heated to 500° C. at 5° C. /hour, held for 3 to 6 hours, and then cooled to room temperature at 50° C. /hour. The bars were sintered in air at 1550° C. for 3 hours to complete the processing of the $ZrSiO_4$ FMs.

Figure 5:
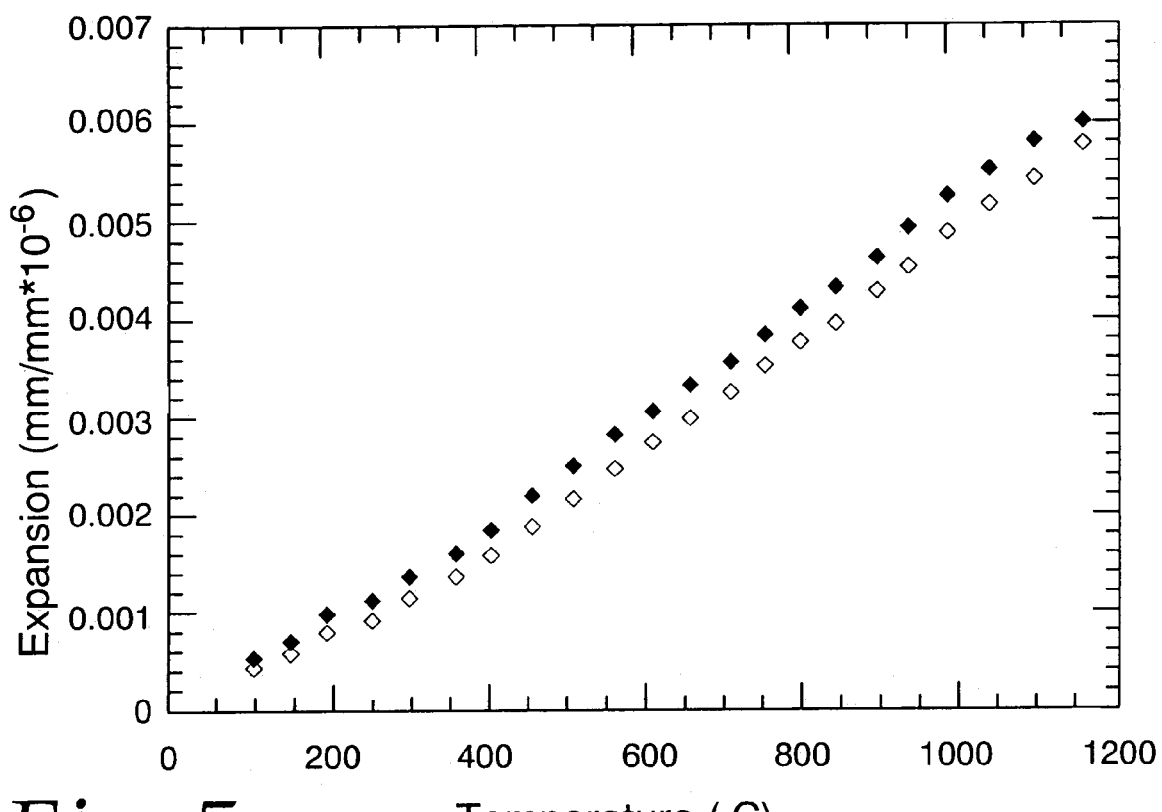
FIG. 5 is a thermal expansion curve for the $ZrSiO_4$ constituents in a duplex filament, in accordance with features of the present invention.

Thermal expansion curves for 95 percent dense $ZrSiO_4$ (i.e., the core material) and 70 percent dense $ZrSiO_4$ (i.e., the sleeve material) are depicted in FIG. 5. These expansions are close enough such that thermal-expansion mismatch will not cause significant cracking of the FM. The FM bars exhibited a 23 volume percent shrinkage between initial pressing and the fired state.

The FM bars were approximately 70 volume percent cell (i.e., core) and 30 volume percent cell boundary (i.e., sleeve). This is lower than the ratio of 85 vol. percent cell and 15 vol. percent cell boundary generally observed for $Si_3N_4$/BN FMs. The average cell size (i.e. core diameter) of the $ZrSiO_4$/$ZrSiO_4$ FMs was approximately 150 microns.

The samples were loaded in an Instron Model 4505 tester, available from Instron Corporation, Canton, Mass.

Scanning electron microscopy revealed a significant difference in shrinkage between the cell (i.e. core) and cell boundary (i.e., sleeve), with the cell shrinking more than the sleeve. This shrinkage will facilitate slippage at the interface between the two phases during a fracture. This, combined with a pullout of individual cores, aid in dissipating energy.

The resulting FM product from the invented process confers several benefits, including being stable under oxidizing, inert and reducing atmospheres. Inasmuch as it consists of one constituent, it is inherently stable over time.

Aside from the production of two-phase FMs, the inventors also have developed a three-phase FM which contains a cell, an interphase, and a matrix. The cell and interphase are made by co-extrusion. The matrix is the effect of a bundling of various filaments. The matrix also can be produced via various infiltration techniques.

A feature of the three-phase FM is that the weakest phase in the structure is not continuous. In a construct where non-continuous phases are utilized, any crack is isolated to a cell or group of cells. In such non-continuous phase structures, crack delamination, especially from out-of-plane loading, occurs discreetly from one cell to the next with each interphase acting as a crack trap. This differs from a continuous phase system wherein energy (manifested as a crack or delamination) traverses the entire structure. Thus, the advantage of this non-continuous construct is that greater strength and fracture toughness result.

While the invention has been described with reference to details of the illustrated embodiments, these details are not intended to limit the scope of the invention as defined in the appended claims. For example, while only two extruder hoppers are depicted in the instant filament-production process, additional hoppers could be added "downstream" from the point where the first sleeve is first laid down. As such, these third or fourth layers are applied distal to the first sleeve hopper, relative to the injection port utilized by the core material. This will facilitate the production of multiplex filaments such as triplex and quadraplex filaments. A head-on view of such a resulting filament would resemble a tree-ring configuration wherein the layers are concentrically aligned and co-axial to each other.

Also, while neat formulations of $ZrSiO_4$ were utilized in the examples herein, the utilization of this oxide, as well as other oxides, containing dopant is within the scope of the instant teaching. The addition of dopants, such as yttrium oxide, boron oxide or boric acid, alkali metal hydroxides (such as sodium hydroxide), magnesium oxide, titanium dioxide and lead oxide further provide a wider range of densities for the core and cell boundary layers. Such dopants would be present in weight percents of approximately less than 2 weight percent.

The embodiment of the invention in which an exclusive property or privilege is claimed is defined as follows:

1. A monolith having an inner region and a peripheral region and comprising a plurality of multi-phase filaments, the filaments each having a cell phase and a boundary phase, whereby said boundary phase is concentrically arranged about the cell phase and coaxial to the cell phase, whereby the peripheral region of the monolith comprises a set of filaments wherein a majority of the peripheral region filaments consist of a 80/20 cell/boundary phase volume percent and the inner region of the same monolith comprises a set of filaments wherein a majority of the inner region filaments consist of $\leq 75$ volume percent cell phase and $\geq 25$ volume percent boundary phase.

2. The monolith as recited in claim 1 wherein no space exists between the arranged filaments.

3. The monolith as recited in claim 1 wherein the filaments have cross sections having the shapes of triangles or squares or rectangles or trapezoids or hexagons or combinations thereof and no void space exists between the filaments.

4. The monolith as recited in claim 1 wherein the cell phase and the boundary phase contain oxides selected from the group consisting of $ZrSiO_4$, $Al_2O3$, mullite, yttrium aluminum garnet, and combinations thereof.

5. The monolith as recited in claim 1 wherein the cross section of the cell phase has a radius of curvature of between approximately 0.02 a and 0.2 a whereby "a" is the dimension of the side of a polygon that is the cross section and wherein the boundary phase cross section has a polygon with a different radius of curvature.

6. The monolith as recited in claim 1 wherein the inner region contains filaments with at least approximately five volume percent lower cell phase compared to the boundary phase of the filaments.

7. The monolith as recited in claim 1 wherein a surface of the boundary phase further comprises a coating to impart a texture to the filament.

8. The monolith as recited in claim 7 wherein the texture increases friction between adjacent filaments.

9. The monolith as recited in claim 1 wherein the inner region of the same monolith comprises filaments with <50 volume percent cell phase and >50 volume percent boundary phase.

10. The monolith as recited in claim 1 wherein filaments of particular cell phase and boundary phase percentages comprise the inner region and filaments of different cell phase and boundary phase percentages comprise the monolith peripheral region so as to achieve desired strength and durability of said monolith.

11. A monolith having an inner region and a peripheral region consisting of a plurality of multi-phase filaments, the filaments each having a cell phase and a boundary phase, whereby the filaments residing in the peripheral region of the monolith consist of a 80/20 cell/boundary phase volume percent and the filaments residing in the inner region of the same monolith consist of $\leq$75 volume percent cell phase and $\geq$25 volume percent boundary phase.

\* \* \* \* \*